(12) United States Patent
Brelig et al.

(10) Patent No.: US 9,646,286 B2
(45) Date of Patent: May 9, 2017

(54) SYSTEM AND METHOD FOR AUTOMATED RETAIL PRODUCT ACCOUNTING

(71) Applicant: ScoutIt, Inc., San Francisco, CA (US)

(72) Inventors: Jonathan Warren Brelig, San Francisco, CA (US); Jared Morton Schrieber, San Francisco, CA (US)

(73) Assignee: ScoutIt, Inc., San Francisco, CA (US)

( * ) Notice: Subject to any disclaimer, the term of this patent is extended or adjusted under 35 U.S.C. 154(b) by 191 days.

(21) Appl. No.: 13/754,664

(22) Filed: Jan. 30, 2013

(65) Prior Publication Data

US 2013/0204754 A1 Aug. 8, 2013

Related U.S. Application Data

(60) Provisional application No. 61/594,550, filed on Feb. 3, 2012.

(51) Int. Cl.
*A01K 5/02* (2006.01)
*G06F 17/50* (2006.01)
*G06Q 10/08* (2012.01)
*G06Q 30/02* (2012.01)

(52) U.S. Cl.
CPC ..... *G06Q 10/0875* (2013.01); *G06Q 30/0201* (2013.01)

(58) Field of Classification Search
None
See application file for complete search history.

*Primary Examiner* — Fateh M Obaid
(74) *Attorney, Agent, or Firm* — Jeffrey Schox; Diana Lin (57) ABSTRACT

A system and method including collecting image data of a purchase receipt; converting image data to machine readable data; generating a receipt model including at least one line item from the machine readable text data; selecting a product profile to associate with a line item through one of a tiered set of receipt heuristics, that includes: through a direct identifier heuristic, searching for a product identifier from a line item that corresponds to a product profile, and through an approximate match heuristic, calculating a score for the line item compared to at least one product profile of a master product list; and accounting for the selected product profile of the line item.

22 Claims, 10 Drawing Sheets

FIG. 1

```
Whole Foods Market
4806 El Camino Real
  650-559-0300

(2) MIDAS TOUCH SINGLE   20.54
+CRV                      0.05

APRIHOP IPA SINGLE        3.95

Subtotal                 24.54
Tax                       1.44
Total                   $25.98

Payment
Mastercard
XXXX XXXX XXXX 1234

Customer Copy
```

```xml
<rdl version="1">
   <retailer>
      <name>Whole Foods Market</name>
      <address>4806 El Camino Real</address>
      <phone_no>650-559-0300</phone_no>
   </retailer>
   <items>
      <item desc="MIDAS TOUCH SINGLE">
         <qty>2</qty>
         <amount>20.54</amount>
         <UPC>XXXXXXXXXXXX</UPC>
         <attr type="+crv">0.05</attr>
      </item>
      <item desc="APRIHOP IPA SINGLE">
         <qty>1</qty1>
         <amount>3.95</amount>
      </item>
   </items>
   <subtotal>24.54</subtotal>
   <tax>1.44</tax>
   <total>25.98</total>
   <payment>
      <type>Mastercard</type>
      <card_no>XXXX XXXX XXXX 1234</card_no>
   </payment>
</rdl>
```

Output: Linked master data

Transaction

| TxID | POI_Id | DateTime | UserID | SubTotal | Tax | Total | Payment |
|---|---|---|---|---|---|---|---|
| 12345 | 1234 | 2011-12-01 | 4598 | 24.54 | 0.96 | 25.98 | MC |

TLog

| TxID | Shrt Description | UPC | UPC_Mtch | LPG | LPG_Mtch | Brand | Brand_Mtch |
|---|---|---|---|---|---|---|---|
| 12345 | ARIHOP IPA SINGLE | 123456789012 | .3 | ARIHOP | .7 | Dogfish | .5 |
| 12345 | MIDAS TOUCH SINGLE | 493978645218 | .5 | MIDAS | .45 | Dogfish | .4 |

FIG. 4

Product Profile Description
Santitas Blended Corn Tortilla Chips

Line Item Description
S N T T S  B L E N D  T R N G
✓ ✓ ✓ ✓ ✓  ✓ ✓ ✓ ✓ ✓  ✓ ✓ x x

FIG. 5A

S N T T S  B L E N D  T R N G
weights: 9 9 7 7 5  8 8 6 6 4  7 7 5 5

FIG. 5B

Character Weight Rules

A=1      N=1
B=3      O=1
C=3      P=3
D=2      Q=10
E=1      R=1
F=4      S=1
G=2      T=1
H=4      U=1
I=1      V=4
J-8      W=4
K=5      X=8
L=1      Y=4
M=3      z=10

S N T T S   B L E N D   T R N G
weights: 1 1 1 1 1   3 1 1 1 2   1 1 1 2

SYSTEM AND METHOD FOR AUTOMATED RETAIL PRODUCT ACCOUNTING

CROSS-REFERENCE TO RELATED APPLICATIONS

This application claims the benefit of U.S. Provisional Application Ser. No. 61/594,550, filed on 3 Feb. 2012, which is incorporated in its entirety by this reference.

TECHNICAL FIELD

This invention relates generally to the retail marketing management field, and more specifically to a new and useful system and method for automated retail product accounting in the retail marketing management field.

BACKGROUND

The average large grocery market or big box store has tens of thousands of products stocked and salable at any given point. There are very few companies and organizations that track customer preference data using actual purchases across different retailers, from which the efficacy of any packaging, display, and/or marketing efforts within any particular retail location can be evaluated. Tracking this data is typically gathered using UPC bar-code scanners distributed to selected consumers, who then upload the scanned data to a remote computer for analysis and sale to the manufacturers. Unfortunately, this method is highly unreliable as consumers typically fail to scan all purchased items; fail to account for multiple purchases of the same item; fail to account for discounts, coupons, and rebates; and often fail to reliably transmit the partially acquired data to the remote computer. Moreover, in consideration for the efforts of the consumer to assist in the market analysis, they are typically compensated both too little and too late, further increasing the lack of reliability of their acquired data because the consumer has little incentive to scan-in products from each and every shopping trip. Accordingly, there is a need in the art for a system and method for automatically acquiring, analyzing, distributing, and managing such consumer panel data or consumer scan panel data. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Automated Retail Market Accounting

Figure 1:
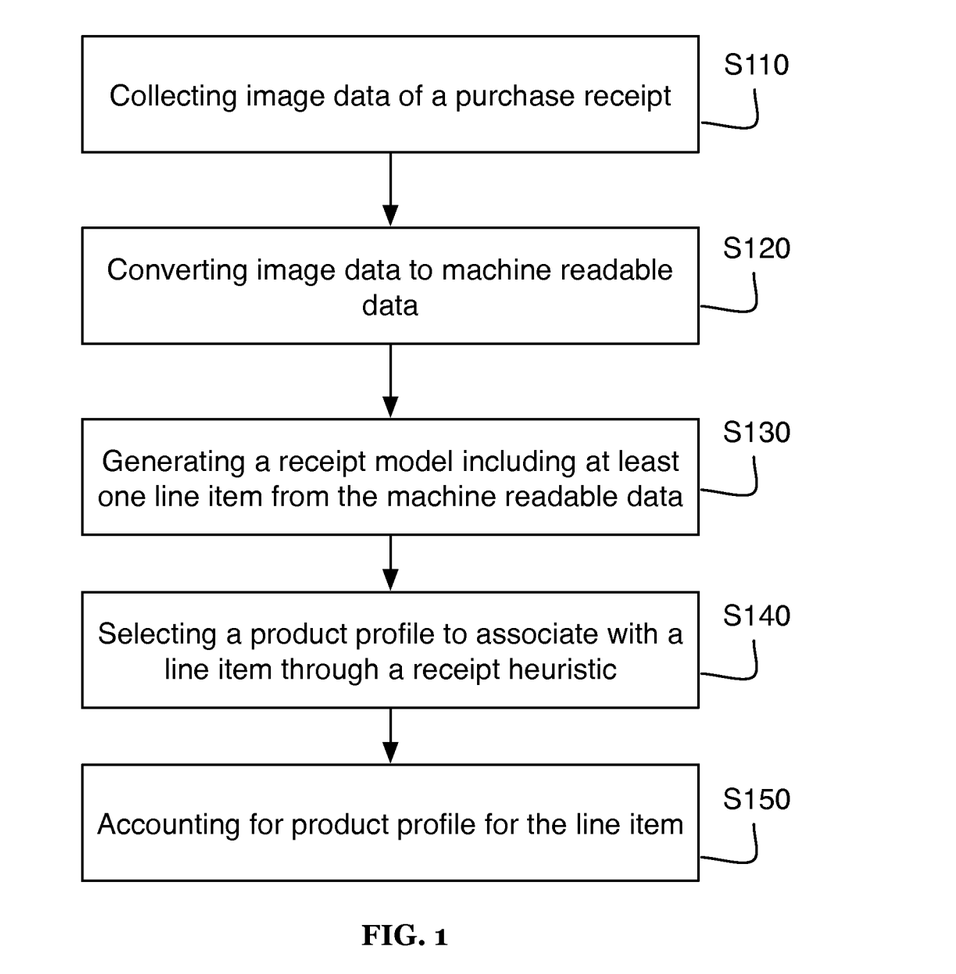
FIG. 1 is a flowchart representation of a method of a preferred embodiment.

As shown in FIG. 1, a method for automated retail product accounting of a preferred embodiment can include collecting image data of a purchase receipt S110; converting image data to machine readable data S120; generating a receipt model including at least one line item from the machine readable data S130; selecting a product profile to associate with a line item through a receipt heuristic S140; and accounting for the selected product profile of the line item S150. The preferred method functions to enable manufacturers and/or other entities to gather reliable product data from one or more consumers/users while ensuring that the data is accurate, complete, and consistent. The method preferably uses captured receipt images that are automatically transformed into data models of product purchases. In one preferred embodiment, the method can further function to incentivize users to collect data by delivering feedback to the user, which can include financial incentives or rewards for participating in the data generation. In another preferred embodiment, the method can further function to provide a service that provides information about receipt images to outside applications and/or merchants. The method preferably leverages receipt specific patterns and data to enable reliable translation of images to product purchase data. Furthermore as the product purchase data is based on a physical proof of purchase (e.g., the paper receipt), the method can generate highly reliable consumer purchase data. Preferably, the method described herein can be performed by one or more of a user's mobile device and/or a remote server, although other components can be substituted and/or added to a functional system as described further below.

Step S110, which includes collecting image data of a purchase receipt, functions to import, retrieve, acquire, and/or receive image data, such as an image of a shopping receipt, which represents the user's retail behavior. Preferably, the image data can include an image of a receipt captured by the user using a mobile device, such as a mobile phone, tablet computer, digital camera, laptop computer, fixed or mobile scanner, or any other suitable imaging device. In one variation of the preferred method, the image data can be acquired using a mobile phone and transmitted to a remote server by an application. Image data may be processed in part or entirely on the mobile phone, and similarly, the image data may be processed in part or entirely on a remote server. In another variation of a preferred method, the image data is received at a remote server, the image data submitted over a provided API.

Step S120, which includes converting image data to machine readable data, functions to convert a receipt image into a parsable translation of receipt information. The machine readable data is preferably machine readable text data but may additionally include other information such as graphic identifiers (e.g., company name corresponding to a logo). Preferably, a suitable receipt processing service operable on a personal computing device or a server can function in part to process or preprocess the image data from raw image data (e.g., JPEG, MPEG, etc.) into a machine-readable format using any suitable technique including, but not limited to, optical character recognition (OCR). In particular, the preferred method can include determining whether the image includes text in it and is thus a candidate for a receipt. Additionally, the preferred method can include stitching one or more images together of the same item, such as different views of the same receipt, in order to optimize the image quality for any native or remote OCR process. In another variation of the preferred method, the receipt processing service can automatically enhance the image for native or remote OCR, which can include processing an image saturation, brightness, contrast, rotation, or any other suitable aspect or feature of the image. In another variation of the preferred method, the receipt processing service can function to map areas of importance within the image, such as columns, rows, headers, and the like. Preferably, the receipt processing service can include a local database of suitable logos against which to compare the image and readily determine the source of the purchased goods. Any ambiguities or errors in converting image data are preferably resolved through Step S130 and S140. Any or all of the foregoing functions or aspects of Step S120 can be readily performed by one or more of a user device or a remote server.

Figure 2:
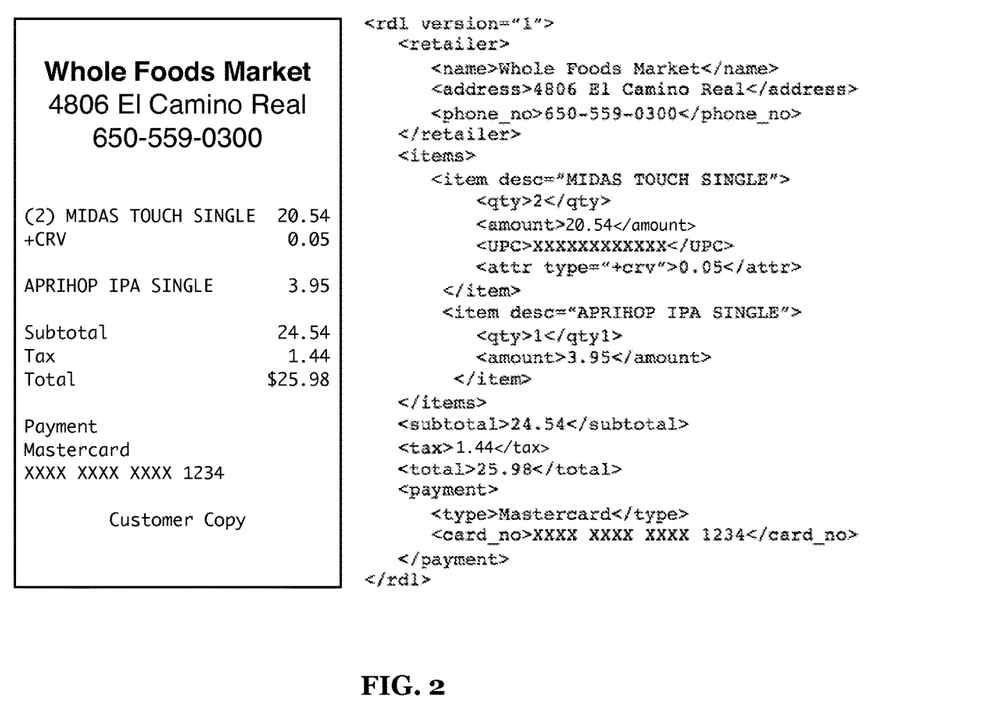
FIG. 2 is an example of a conversion of image data to a receipt model of a preferred embodiment.

Step S130, which includes generating a receipt model including at least one line item from the machine readable data, functions to structure the receipt text into a standardized format. The receipt model is preferably structured as a receipt definition language (RDL) description that includes specific formats and concepts particular to each retailers' receipts, such as store name, store location, receipt timestamp, discounts, loyalty reward, coupons, multiple purchases of a single item, and/or variable weight items. The RDL may be substantially similar to a markup language or structured text description such as XML, JSON, or any suitable data structure. The generated receipt model preferably further functions to standardize the content of variously formatted receipts from multiple retailers, or even different locations of a single retailer. Generating a receipt model can be performed at one or both of a user device or a remote server, either in part or in its entirety. Preferably, Step S130 can include mapping a retail banner identifying the retailer and a store identifier to a local database, and additionally a phone number or address of the store location. Step S130 can preferably further function to extract one or more fields from the receipt text, including, for example, purchase amounts, UPC codes, product descriptions, variable weight item descriptions, weights, and the like. Step S130 can further preferably return and perform successive iterations of analysis on the text to collapse related lines into a single line item purchased, to sum up multiple quantities, and to identify all known tags for the aforementioned fields as well as any unknown tags or attributes on the receipt, such as taxes, for example. An example input and output for Step S130 is shown in FIG. 2. A line item of a receipt model will preferably identify and set as parameters of a line item a product description (e.g., a name, code, abbreviation, etc.) and other metadata such as quantity, product metrics, and price. The product metrics preferably include any suitable description of packaging type, weight, volume, size, form-factor, or other suitable forms of quantifying the product unit.

Step S140, which includes selecting a product profile to associate with a line item through a receipt heuristic, functions to associate, correlate, register, and/or map the receipt model data with master data for the products. A receipt processing service, operable on one or both of a user mobile device or remote server in part or in its entirety, preferably selects a product profile for each line item of a receipt model. The line items are preferably extracted when converting image data to machine readable text data and generating the receipt model. The product profile selected is preferably a profile that corresponds to the product purchased or that is predicted to correspond to the line item. Step S140 is preferably performed iteratively to select product profiles for each line item in the receipt model. A receipt heuristic is preferably a receipt model processing sequence, which may include querying, matching, item lookup, approximate string matching (i.e., fuzzy search), machine learning, crowdsourcing, and/or any suitable form of receipt model processing to identify a corresponding product. A receipt heuristic will typically rely on matching criteria specific to the format of typical paper receipts. In some cases, a receipt heuristic may be tailored for a specific store (such as encoding the formatting and labels of a particular merchant). Two stores will often sell the same products, but the stores will represent the same product in varying receipt formats. A receipt heuristic preferably matches a store specific item representation to a universal product profile.

If no product is found to correspond to the line item then a new product profile may be created using information from the line item. Alternatively, the line item may be skipped, marked to be analyzed by a crowdsource user, marked to be reattempted at a later time when more data is obtained, and/or treated in any suitable manner.

Selecting a product profile through a receipt heuristic preferably functions to account for complications in matching items in a receipt with actual products. For example, the receipt model preferably includes text data that is an accurate translation of the text on the physical receipt, but during the generation of the machine readable text data, inaccuracies may occur. At least one of the receipt heuristics used to select a product profile is preferably configured to account for inaccuracies. In another example, the text description of a purchased item in the receipt may be a store specific code. A receipt heuristic can additionally be configured to account for receipt labeling patterns in product fuzzy search.

Figure 3:
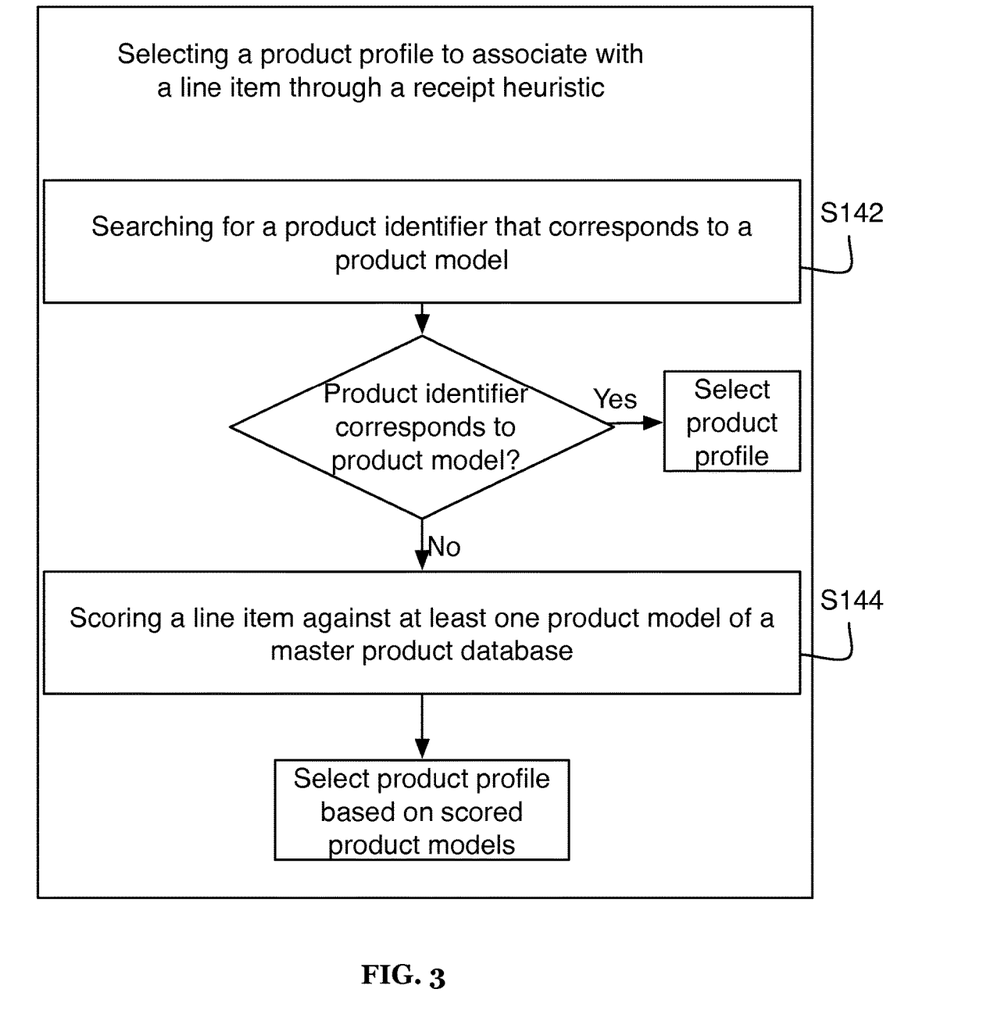
FIG. 3 is flowchart representation of tiered receipt heuristics of a preferred embodiment.

A product profile is preferably selected through at least one of a set of tiered receipt heuristics. There can be any suitable number of receipt heuristics that may be performed sequentially and/or in combination. In one variation, a first receipt heuristic is performed, and if no product profile is identified for selection, a second receipt heuristic is performed. In another variation, a first and second receipt heuristic are performed and the product profile is selected based on the combined results of the receipt heuristics. In one preferred embodiment, a direct identifier heuristic will initially try to search for a product identifier that corresponds to a product model S142, and if a product identifier is not found or does not satisfy a match criteria, an approximate match heuristic will score a line item against at least one product model of a master product database S144 as shown in FIG. 3.

Step S142, which includes searching for a product identifier that corresponds to a product model, functions to perform a lookup of at least part of a line item description to match a line item with a product. A product identifier may be a universal product code (UPC) or a store product code. Additionally, a product identifier may be the product description that was previously encountered when selecting a product model. Product models are preferably looked up in a master product database. The master product database is preferably a database of an accumulated and aggregated form of product profile data. The master product database will preferably characterize product profiles with at least one product identifier and may additionally include multiple product identifiers to account for different ways of referring to the product (e.g., UPC, store specific codes, abbreviated descriptions etc.) and may additionally store data on line item meta data such as pricing or purchase history. Additionally, a receipt processing service may facilitate querying an outside product database with a product identifier to identify a product model. In other words, the receipt processing service may perform an automated web scrape for a retailer and product number through any suitable search engine API. Step S142 is preferably performed initially. If a product identifier is found in the product model to correspond to an identifier of a product profile, the corresponding product profile is selected and associated with the line item.

Figure 4:
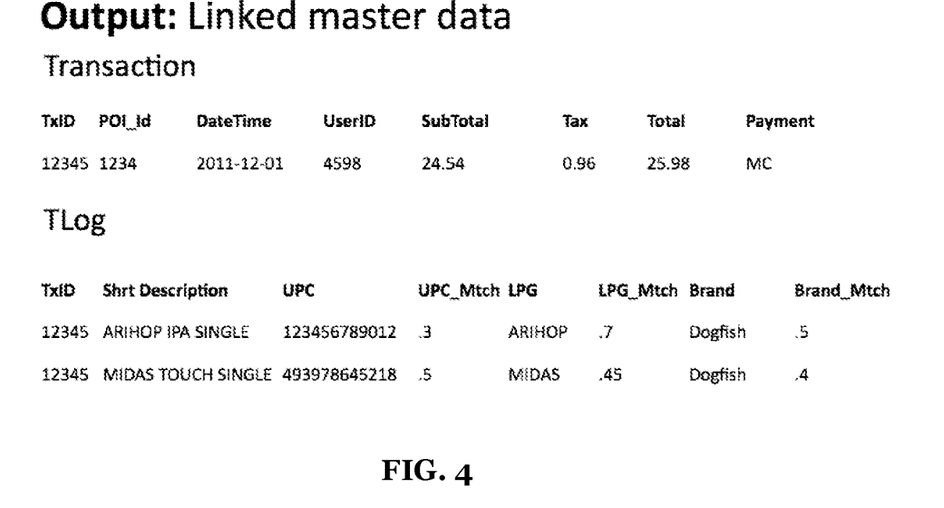
FIG. 4 is an example dataset.

Step S144, which includes scoring a line item against at least one product model of a master product database, functions to perform a fuzzy match for a product model. At least one parameter of a line item is compared to at least one product model of a master product database. The fuzzy search may additionally be performed against web scraped data or outside product databases (e.g., a retailer online store). Scoring of a line item is preferably used to identify the best match for a line item, and the selected product model for the line item is preferably the product model that satisfies a set of criteria. Typically, the selected product model is the product model with the highest score or the score indicating the closest match. In one variation, scoring a line item is a secondary receipt heuristic that is performed if the search for a product identifier does not return a product profile. Typically, corresponding parameters of a line item and product model are compared. For example, when scoring based on product description, the product description parameter of the line item is compared to a product description or a product model. Suitable fuzzy matching methods can include, for example, Lucene (n-gram detection, Levenschtein distance, regular expressions) or a MYSQL database. Preferably, the output of a fuzzy match process can include the type of match (UPC, Line-Price Group, Brand) as well as a match confidence score—the latter of which is adjustable based upon further data processing and acquisition throughout the entire system described herein. An example generated dataset is shown in FIG. 4. Preferably, fuzzy matching incorporates receipt specific patterns (e.g., retailer-specific receipt formats, syntax, and patterns) into the scoring of product models to improve matching performance beyond regular string pairing.

Figure 5A:
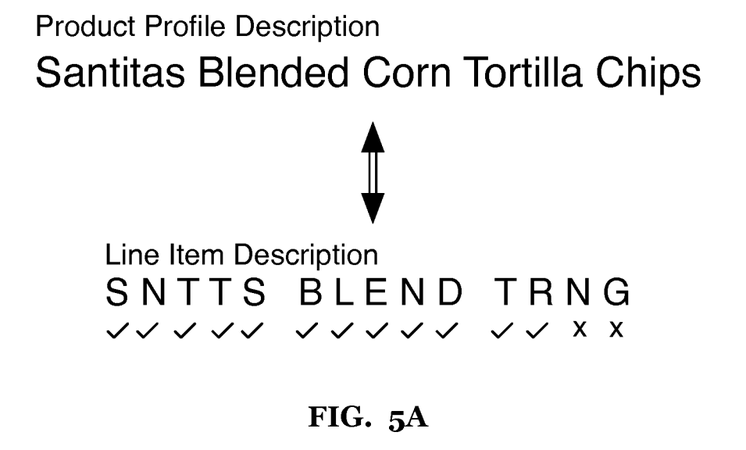
FIGS. 5A-5C are exemplary representations of receipt scoring patterns of a preferred embodiment.

As shown in FIG. 5A, first receipt specific scoring pattern may include scoring based in part on character sequence order for the text description when comparing a line item to a product model, which functions to account for receipt abbreviating product names and descriptions by leaving out some letters and including key letters. For example, "MILK" may be abbreviated as "MLK," and the character order-scoring pattern will preferably score such descriptions as a possible match. Such character order may not indicate a definite match and may depend on additional scoring patterns to correspond. For example, if the character order of the line item description matches a product model description and the price is approximately the same, then the product is likely the same product. Character sequence matching may additionally account for character set rules such as using an 'x' as a substitute for the character sequence 'cks'. Machine learning may additionally be applied to identify suitable character sequences.

Figure 5B:
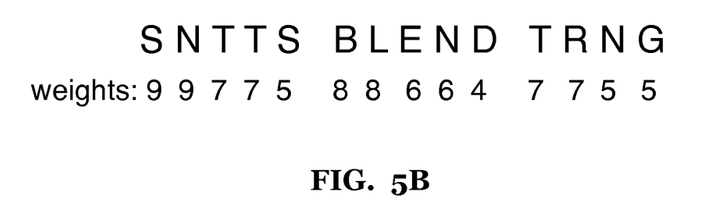

Another receipt specific scoring pattern may include weighting string matching based on sequence order of the description text as shown in FIG. 5B. The first word is preferably given more weight than the second word, and furthermore, the beginning of the first word is given more weight than the end of the first word. Machine learning may be applied to determine scoring weights of first x-number of letters matched verses x+1 number of letters matched. Similarly, machine learning may be applied to determine scoring weights of first x-number of words matched verses x+1 number of words matched. Weighting based on sequence order is preferably used in scoring a comparison based on character matches of the text description of the line item and a text description of a product profile.

Figure 5C:
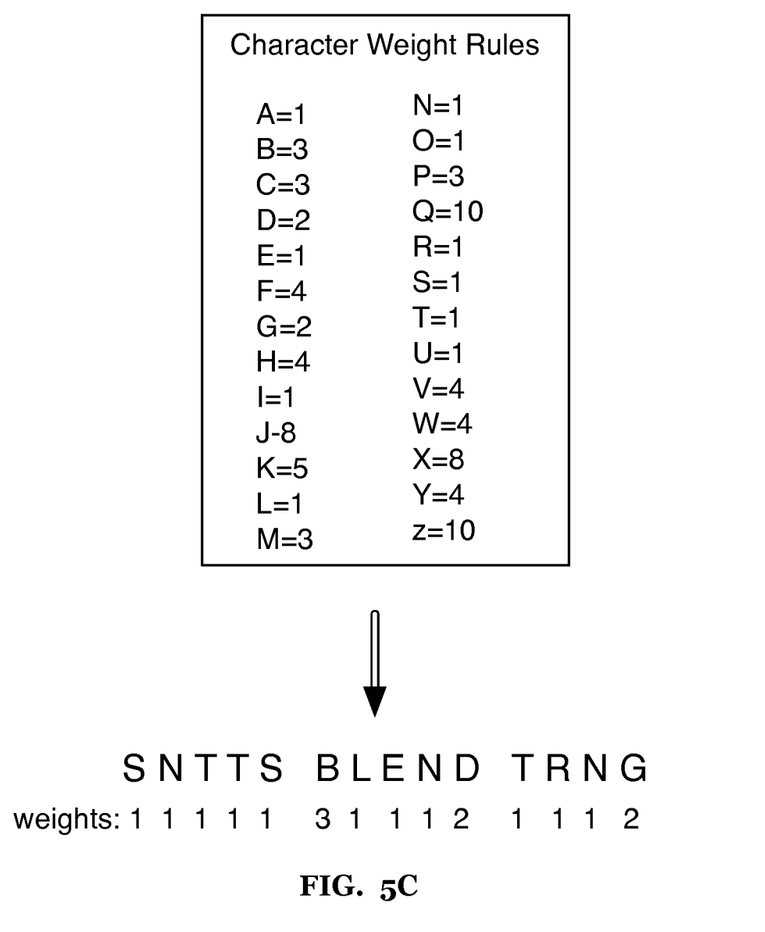

Another receipt specific scoring pattern may include weighting character matches based on a character weight rule as shown in FIG. 5C. Particular character matches may be better indicators of a match than other characters. Each character may have a static scoring factor as specified in a character weight rule. Alternatively, a scoring factor of a character may be dynamically determined such as by being based on merchant, other identified products purchased on the receipt, possible product model candidates, etc. Weighting based on a character set rule is preferably used in scoring a comparison based on character matches of the text description of the line item and a text description of a product profile.

Another receipt specific scoring pattern may include factoring in line item meta data. Line item meta data preferably includes parameters of a line item other than the description/product identifier such as price, product weight, product packaging, volume, product size, product category, product quantity, product discounts, or any suitable supplemental information related to the line item purchase. Use of meta data may be used to filter considered product models and/or further refine scores of considered product models. Machine learning may be applied to the meta data to identify a product model or possible product models. For example, a product may not have a direct string match to a product description of a product model in the master product database, but meta data information showing a matching unit price and an identical packaging volume can be considered to select the product.

Another receipt specific scoring pattern may include factoring in context parameters of the receipt model. Context parameters preferably includes parameters of the purchase outside of the line item such as merchant identifier, time of purchase, geographic location, purchaser name, store account ID, category identifier, purchase total, other products purchased, and/or any suitable parameter providing context of the purchase of the line item. Context parameters can preferably be used to narrow the candidates of product models, for selecting one or more specific receipt heuristics to use in selecting a product, and/or altering the processing in any suitable way. For example, if a merchant identifier is identified, a merchant specific receipt heuristic may be used in selecting a product profile. The merchant specific receipt heuristic will preferably account for merchant specific receipt patterns. Machine learning may be applied to context parameters to identify product model(s).

Another receipt specific scoring pattern may include matching product descriptions while accounting for character set rules. Character set rules may specify sets of characters and character sequences that are treated as equivalent or at least a partial match. For example, the characters "cks" may be abbreviated as an "x". Additionally, some characters may be considered as wild card charters such as periods or slashes that denote abbreviations. For example the strings "Starbucks", "S/bucks", and "starbux" may all be considered equivalent. Similarly, some character sequences may be ignored. Such as the character sequences of "(A)", "N", "Tx", "2QTY", and/or any suitable character sequences. The character set rules may be dynamically adjusted based on merchant, context parameters of the receipt, or any suitable condition.

Figure 6:
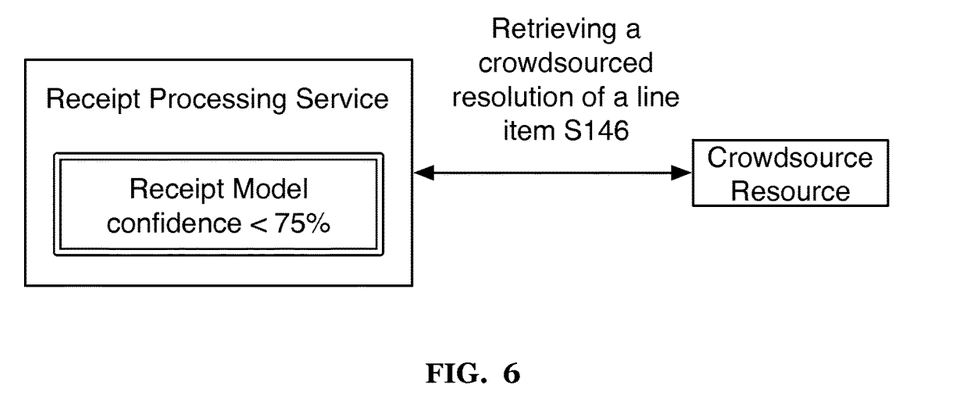
FIG. 6 is a schematic representation of retrieving a crowdsourced resolution of a line item of a preferred embodiment.

As an additional or alternative receipt heuristic, Step S140 of selecting a product profile to associate with a line item may include retrieving a crowdsourced resolution of a line item S146, which functions to use user-based input on at least a part of the receipt processing. Crowdsourced users may be a selected worker, such as a worker using Amazon's Mechanical Turk, or the crowdsourced user may be an employee, user, or any suitable remotely located user. Use of crowdsource resolution in a preferred embodiment is mitigated by using crowdsource resolution in situations where the receipt processing services fails to identify a product profile for a line item as shown in FIG. 6. The task request submitted to the crowdsource user may be a request for transcription of part or all of a receipt, for matching a line item to a product profile, identifying a merchant from a graphic, or any suitable task to facilitate identifying a product profile for a line item. In one variation, a user that captures a receipt image (e.g., the customer) can preferably provide input that can supplement the process of identifying products. A user can take a picture of a product, select a product from a list, enter the name of the product, scan a universal product code, answer a survey, or perform any supplemental input to facilitate identification of a product profile. The user may provide the information preemptively or reactively (e.g., when a line item can not be identified as a product.

Crowdsource resolution is typically engaged when the receipt processing service has low confidence in the machine readable text data. A confidence metric may be obtained directly from the OCR process, image processing, and/or through receipt analysis. As one exemplary confidence analysis, the accounting of a receipt may be verified—if the line item prices, discounts, taxes, and other fees do not sum to the receipt total then the receipt processing service will typically have low confidence in the machine readable text data. Use of crowdsourced resolution may additionally be dependent on the state of the product master database. In some variations, some unidentified line items may be allowed, but when identical unidentified line items are processed in multiple receipts then a crowdsourced solution may utilize user input to supplement data. For example, a new product may be released for which no information is known, so when encountered in a receipt it may not be identified (or may even be misidentified). After the new product (and the associated line item description) is encountered at least once, crowdsourced resolution of the new product may be used to obtain a UPC, un-abbreviated product name, or any other information needed to complete the product summary of the new product.

Step S150, which includes accounting for the selected product profile of the line item, functions to augment a data object to indicate the purchase of a product profile associated with the line item. A variety of tasks may be performed to account for the product profile associated with the line item. As one type of accounting task, data may be generated and/or augmented to reflect information from the receipt. As an alternative accounting task, feedback to a user may be transmitted to an application of the user.

Figure 7:
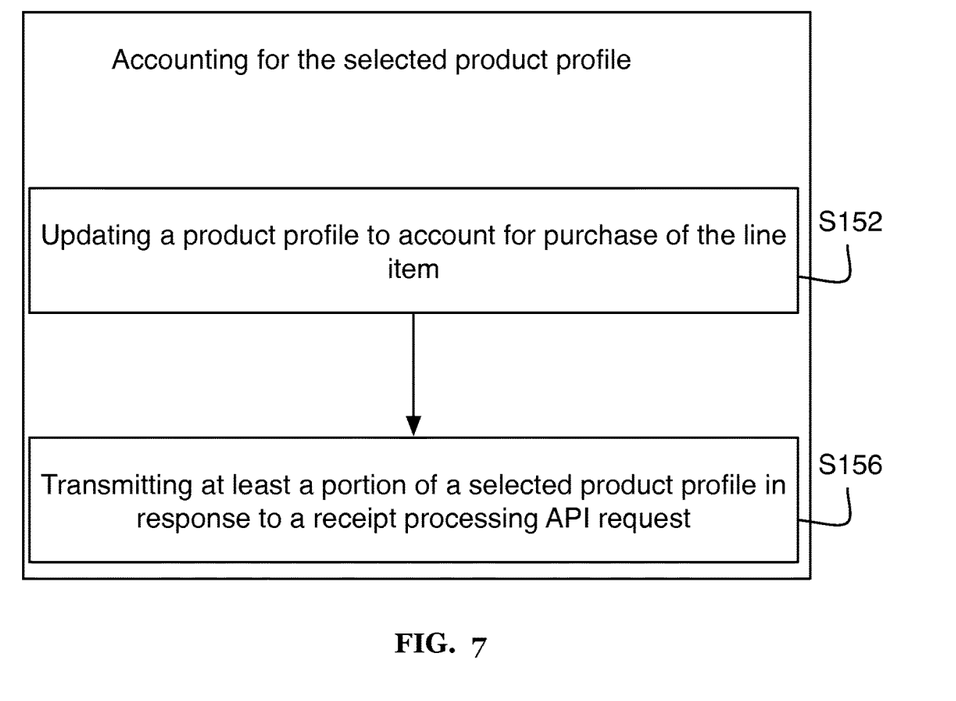
FIG. 7 is a flowchart representation of variations of accounting for the selected product profile of a preferred embodiment.

Preferably, accounting for the selected product profile includes updating a product profile to account for purchase of the line item S152 as shown in FIG. 7. Updating a product profile may include accounting for purchase history (time and count of product purchases), identity of purchasers (e.g., customer demographics, reward card IDs, etc.), where products are being sold, aggregating store product IDs, how products are being marked in receipts (e.g., adding store specific product codes), what products are purchased together, pricing of products, use of promotions, and/or any suitable update or new stored data. The new data is preferably stored in the master product database, but may alternatively be stored in any suitable database or storage device. Accounting for product profile purchases is preferably performed by a remote server that is accessible and/or communicable with a plurality of mobile devices associated with a plurality of users. By accounting for purchase of a line item, data for products sold across multiple merchants and locations can be tracked and analyzed, vastly improving visibility into purchase behavior of customers. Preferably, a product profile can be generated for each product in response to a large number of selected product profiles for each retail experience of each user within the system. As such, a preferred product profile can include retail sales data for any selected manufacturer, any brand or sub-brand of the manufacturer, any location, time, marketing campaign, retailer, delivery means, pricing, or any other suitable measure or characteristic of the identified product(s). As an example, a beverage manufacturer might be interested in a product profile of its brands and/or sub-brands based on purchase location, time of day, time of year, retailer, purchase price, coupon, rebate, or other promotional activity associated with the product and/or the manufacturer. A product profile may additionally include receipt information such as description abbreviations, store product codes or any suitable information that may be used to facilitate subsequent product profile selection. While a product profile is preferably maintained and/or referenced in a master product database, a product profile may alternatively be segmented into various data structures stored in any suitable number of databases. The data architecture may have any suitable arrangement. For example, purchase records, mapping of product names to receipt abbreviations, and product meta data may all be stored in separate databases which may be additionally organized or distributed in any suitable data architecture. As each product profile for each user is based upon photographic imagery of the actual purchase of the product, the data that populates the product profile is more reliable and accurate than what is currently available to manufacturers, retail product marketers, and/or other business entities.

Figure 8:
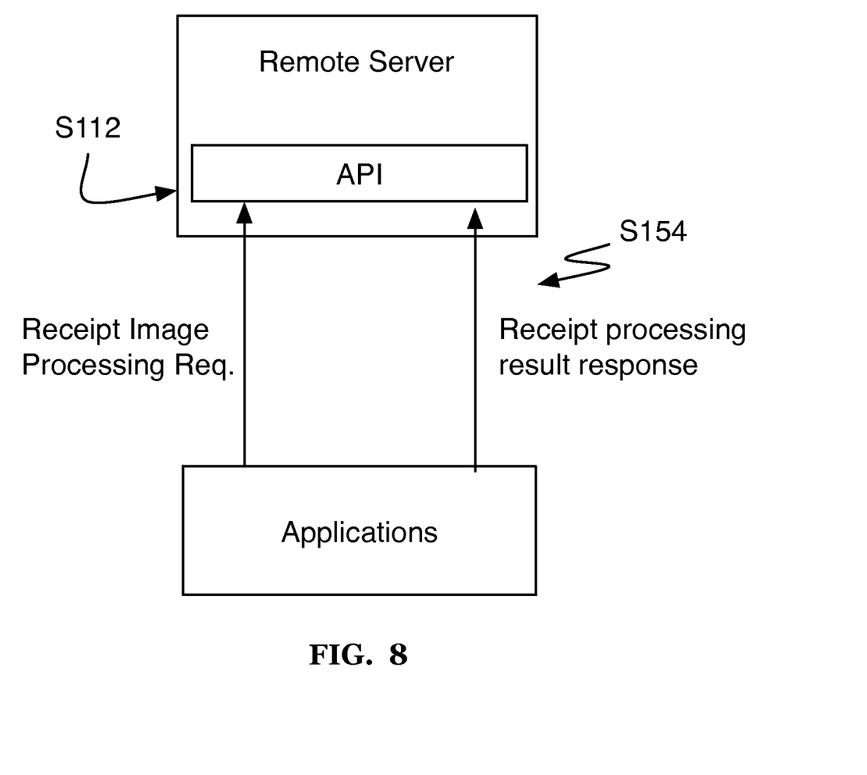
FIG. 8 is a schematic representation of an alternative variation of accounting for the selected product profile of a preferred embodiment.

Additionally or alternatively, a method of a preferred embodiment may include providing a receipt processing application programming interface (API) S112 and accounting for the selected product profile may include transmitting at least a portion of a selected product profile in response to a receipt processing API request S154 as shown in FIG. 8. A receipt processing API primarily functions to enable outside parties to benefit from centralized receipt analysis. Various applications and services could leverage the information afforded by the method. As a centralized service, more and more receipt data is collected, which may be leveraged to improve the receipt processing and product profile identification of the service. In one embodiment, the API may return the receipt model with line items supplemented or augmented with product profile information. In another embodiment, the API may allow advanced queries such as filtering receipts for a particular product. For example, an application may only be concerned if you purchased one particular product at a particular time along with a second particular product; the API response can be a true false response based on the receipt processing.

Similarly, at least a portion of the selected profile may be transmitted to a manufacturer or any subscribed entity, which may function to transfer and monetize the product profile for use by an interested manufacturer. Preferably, the method may include providing access to the remote server to a manufacturer or any suitable account holder such that a manufacturer can access, manipulate, copy, retrieve, download, and/or receive a selected product profile. As noted above, a preferred product profile can include retail sales data for any selected manufacturer, any brand or sub-brand of the manufacturer, any location, time, marketing campaign, retailer, delivery means, or any other suitable measure or characteristic of the identified product(s). Sharing of the product profile data can preferably be performed by a remote server in communication with one or more user mobile devices and accessible at and/or in communication with at least one computer associated with a manufacturer.

Additionally or alternatively Step S150 may include transmitting feedback to the user S156, which functions to communicate and/or maintain a relationship with the user through the transmission of a reward, incentive, or information in consideration for the user's providing of the data in Step S110. Transmitting feedback is preferably used in combination with other line item accounting as shown in FIG. 7. In particular, Step S150 can include transmitting feedback in the form of an electronic reward or incentive to a mobile device or account of the user, such as, for example, a coupon, discount, cash-back incentive, or any other suitable monetary or non-monetary form of consideration. Alternatively, the feedback can include safety information, allergen information, recall information, product registration with a retailer or manufacturer (e.g., for warranty registration, loyalty point redemption, product activation or other purposes), or any other public health, safety, or welfare information that can and should be distributed to consumers of particular products. As an example, purchasers of produce that might be tainted with bacteria can be contacted directly in response to UPC codes, retailer product numbers, purchase locations, purchase dates, and the like, as opposed to via general announcements or safety bulletins. Additionally or alternatively, the feedback can include one or more applicable recipes that use ingredients identified within the receipt image. In another alternative, the feedback can include product recommendations based on purchased products. In another alternative, the feedback can include one or more trigger surveys directed to the user based on the content of the imaged receipt. An example trigger survey includes offering a coupon or other compensation for answering questions relating to the purchase of an identified product(s).

Preferably, the feedback can be transmitted from the remote server to the mobile device of the user. Alternatively, the feedback can be transmitted directly from a manufacturer (e.g., a computer associated with the manufacturer) to the mobile device of the user. In another alternative, the remote server can function as a clearinghouse for receiving rewards or incentives from the manufacturers for distribution to the mobile device of the user. Any other suitable financial or logistical arrangement of forms of feedback and distribution of the electronic communications can be used.

2. System

Figure 9:
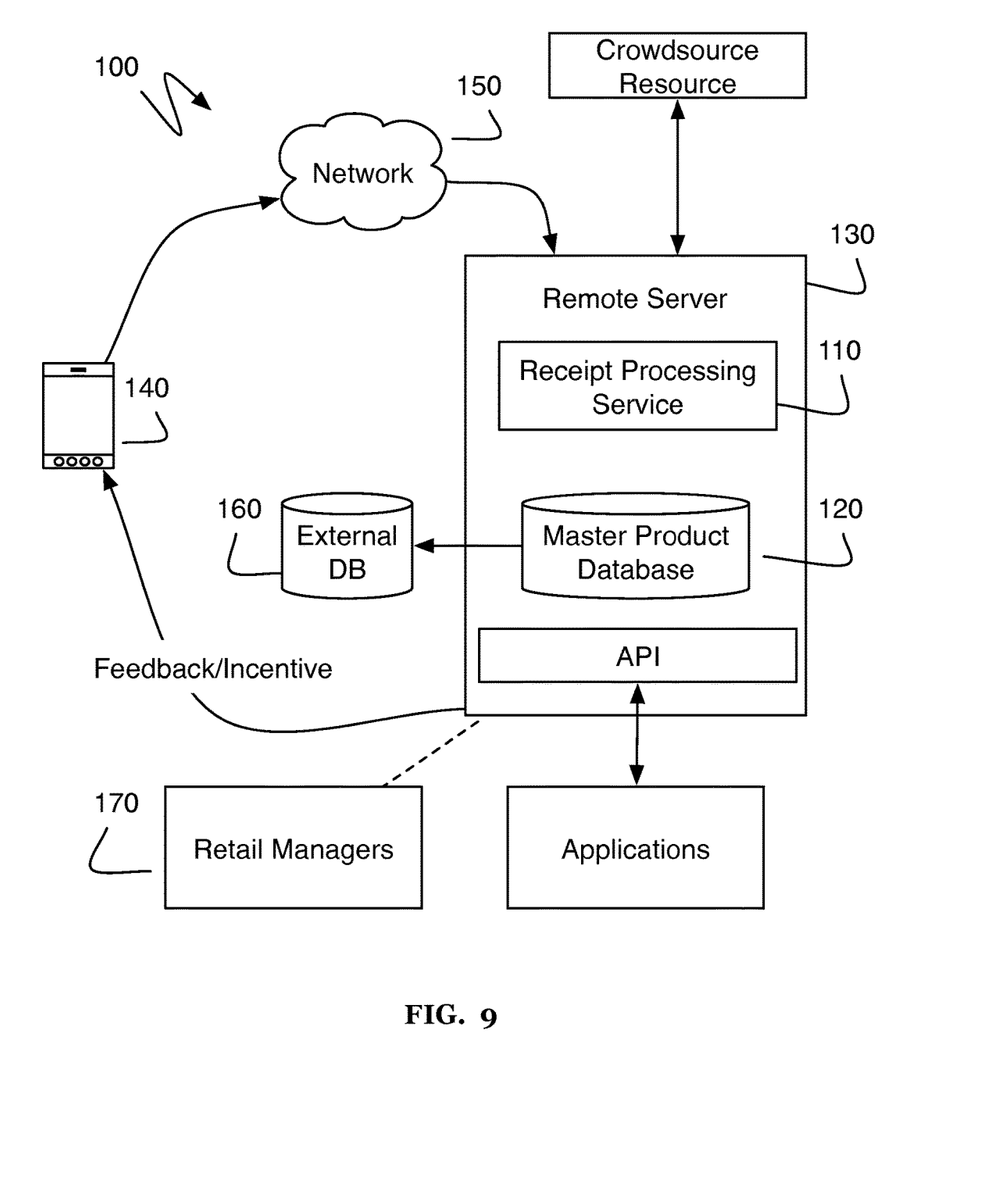
FIG. 9 is a schematic representation of a system of a preferred embodiment.

As shown in FIG. 9, an operating environment of a system 100 of the preferred embodiment can include a receipt processing service 110 and a master product database 120. The receipt processing service is preferably operable, in part or in entirety, on a mobile device 130 and/or a remote server 140. The system 100 is preferably configured to perform the method as described above. In one preferred embodiment, the system is configured for use by a plurality of users/applications, wherein the system translates and acts on receipt data received from various users.

The receipt processing service no functions to receive, organize, maintain, and update one or more datasets relating to a user's retail experience. More preferably, the receipt processing service 110 functions to convert receipt image data to machine readable descriptions of purchased products and then into identified product profiles for line items of the receipt. The receipt processing service no preferably functions in combination with the master product database 120 to identify which products were purchased as indicated in a receipt. The receipt processing service can additionally extract other information such as merchant location, time of purchase, coupons and sales applied towards purchase, user IDs or indicators for a receipt, and/or any other information portrayed in a receipt. The receipt processing service preferably utilizes receipt specific matching algorithms as described above to identify products when a product cannot be found directly through a product identifier. The receipt processing service 110 may be operable as a processor module in an application of the mobile device 130, on the remote server 140, or divided in operation between the mobile application 130 and the remote server 140.

The master product database 120 functions to store a repository of product profiles used to store, maintain, update, correct, share, retrieve, and/or distribute data associated with a product profile and any associated particular product of interest. The master product database 120 is preferably continually updated through the operation of the system. New product profiles and additional information related to products is preferably added to product profiles automatically. The processing of new receipts can result in the automatic creation of new product profiles and updates to purchase history of products. While the master product database 120 is described as a single database, the master product database 120 can be any suitable data architecture employing any suitable number and type of data storage mechanisms. The master product database 120 may be a set of databases (linked or unlinked) that define product descriptions, global purchase history, personal purchase history, identification history, and/or any suitable information. A product profile of a preferred embodiment may include parameters and/or references to product identity, purchase description, purchase date, purchase amount, purchase location, purchase method, product UPC code, product store code, brand name, sub-brand name, list of merchants selling the product, product purchase records (which may include purchase time, location, user ID, other products purchased, total purchase count, etc.), receipt description, product metrics, product prices, product promotions, average or mean purchase quantity, product purchase, and/or any suitable parameter of a product. Other product related databases, such as mappings between receipt abbreviated words and full text words, may additionally be included and incorporated into the use of the master product database 120.

The mobile device 130 and the remote server 140 are preferably connected through a network 150. The mobile device 130 of the preferred embodiment can include a display 134, a camera (not shown), memory storage (not shown), a communications module, and a processor (not shown) connected to each of the display, camera, memory storage and/or communications module. The mobile device 130 of the preferred embodiment can include any suitable type of mobile computing apparatus such as a smart phone, a personal computer, a laptop computer, a tablet computer, a television/monitor/camera paired with a separate handheld orientation/location apparatus, or any suitable combination thereof. The mobile device 130 of the preferred embodiment can be connectable, either through wired or wireless means, to one or more of a satellite positioning system, a local area network or wide area network such as a WiFi network, and/or a cellular communication network (generally designated network 150. In one alternative embodiment, the mobile device 130 of the preferred embodiment can include a GPS transceiver, although any other type of transceiver for satellite-based location services can be employed in lieu of or in addition to a GPS transceiver. The preferred mobile device can function to capture, retrieve, process, store, and transmit image data relating to a user's purchase. Preferably, the image data is a receipt as described above and the mobile device 130 can be configured with a native application, hardware, software, firmware, or any suitable combination thereof to perform one or more functions associated with the method of the preferred embodiment described above.

As shown in FIG. 9, a remote server 140 of the preferred embodiment preferably functions to receive raw, processed, or partially processed data associated with user retail behavior and to categorize, manipulate, assess, process, and analyze the user data into a product profile that may be used in a variety of ways including enabling one or more manufacturers to assess their respective marketing efforts, providing a receipt processing service, and/or providing purchase feedback to a user. The remote server 140 can be alternatively configured as one or more standalone modules, processors, clusters, server farms, networked computers, databases, and/or cloud-based software systems. The preferred remote server 140 can be configured as hardware, software, firmware, or any suitable combination thereof to perform one or more functions associated with the method of the preferred embodiment described above.

As shown in FIG. 9, the system 100 of the preferred embodiment can further include a retailer/manufacturer external database 160 that is remotely accessible from at least the remote server. As noted above, master data for each product can be accumulated according to a tiered process, wherein the remote server 140 first attempts to match a UPC code, then an item number for the specified retailer, then an automated web scrape for a retailer and product number through a search engine API. Accordingly, the master product database 120 can preferably access and/or scrape external databases 160, such as search engine servers, that might contain identifying data concerning one or more products identifiable by their association with one or more of the retailer or manufacturer. As noted above, if none of the foregoing processes yield a confirmed match for the purchased product, then the remote server 140 can be configured to perform a fuzzy match using UPC database records, brand name records, previous receipt matching records, or processing through a turk-type automation. Suitable fuzzy matching methods can include for example Lucene (n-gram detection, Levenschtein distance, regular expressions) or a MYSQL database, which can be locally stored and/or maintained at or on the remote server 140. As noted above, the output of a fuzzy match process can include the type of match (UPC, Line-Price Group, Brand) as well as a match confidence—the latter of which is adjustable based upon further data processing and acquisition throughout the entire system described herein. Preferably, interaction with the retailer-manufacturer external database 160 functions to generate a dataset that can include at least the product identity, purchase date, purchase amount, purchase location, purchase method, as well as other identifying information such as a UPC code, brand name, sub-brand name, and the like.

As shown in FIG. 9, the system 100 of the preferred embodiment can further include a retail manager 170 having access to and/or in communication with the remote server 140. Preferably, the retail manager 170 is permitted access to the remote server 140 in order to access, manipulate, copy, retrieve, download, and/or receive a selected product profile. As noted above, a preferred product profile can include retail sales data for any selected manufacturer, any brand or sub-brand of the manufacturer, any location, time, marketing campaign, retailer, delivery means, or any other suitable measure or characteristic of the identified product/s.

The system and method of the preferred embodiment and variations thereof can be embodied and/or implemented at least in part as a machine configured to receive a computer-readable medium storing computer-readable instructions. The instructions are preferably executed by computer-executable components preferably integrated with the components of the above system and/or configure for the steps of a method of a preferred embodiment. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various processes and components of the above systems and methods.

As a person skilled in the art will recognize from the previous detailed description and from the figures and claims, modifications and changes can be made to the preferred embodiments of the invention without departing from the scope of this invention defined in the following claims.

What is claimed is:

1. A method for digitally tracking each of a set of physical products purchased by a user in a shopping trip in order to personalize digital purchase feedback served to the user, the method comprising:
   a. capturing receipt image data of a physical purchase receipt from a camera of a user device, associated with a first user account, wherein the physical purchase receipt comprises a set of physically printed line items corresponding to the set of physical products purchased in the shopping trip;
   b. converting the captured receipt image data to machine readable data;
   c. generating a receipt model including a set of line items from the machine readable text data, the set of line items corresponding to the set of physically printed line items;
   d. selecting a product profile to associate with a line item through one of a tiered set of receipt heuristics, comprising, through a direct identifier heuristic, searching for a product identifier from a line item that corresponds to a product profile, and through an approximate match heuristic, calculating a score for the line item compared to at least one product profile of a master product list, and selecting the product profile based on the score;

e. at a remote server, accounting for a set of selected product profiles associated with the set of physical products purchased in the shopping trip, comprising accounting for the selected product profile of the line item;

f. at the remote server, updating a purchase history of the first user account based on the set of selected product profiles of the line item;

g. at the remote server, generating purchase feedback tailored to the first user account based on the updated purchase history;

h. at the remote server, transmitting the purchase feedback to the user device;

i. repeating a) to h) for a second physical purchase receipt associated with a second user account; and j. at the remote server, sending data for the selected product profile, generated based on the first and second physical purchase receipts, to a third user device associated with a third user account in response to receipt of a request for the data.

2. The method of claim 1, wherein calculating a score for the line item comprises factoring in at least one context parameter of the receipt model.

3. The method of claim 1, wherein generating a receipt model comprises identifying a merchant identifier from the machine readable data; and further comprising limiting product profiles compared in the master product list to products associated with the identified merchant identifier; and executing a receipt heuristic based on the merchant identifier.

4. The method of claim 3, wherein generating a receipt model comprises identifying a category identifier of at least the one line item from the machine readable data; and further comprising limiting product profiles compared in the master product list to product profiles associated with the category identifier.

5. The method of claim 1, wherein generating a receipt model further comprises identifying in the at least one line item a text description and price parameter.

6. The method of claim 5, wherein calculating a score for the line item compared to at least one product profile of the master product list comprises scoring a comparison based on character matches of the text description of the line item and a text description of a product profile.

7. The method of claim 6, wherein character matches are weighted based on a character weight rule.

8. The method of claim 6, wherein scoring a comparison based on character matches comprises scoring based in part on character sequence order for the text description.

9. The method of claim 6, wherein scoring a comparison based on character matches comprises weighting a word match greater than a subsequent word match and weighting a character match of a first word greater than a subsequent character match of the first word.

10. The method of claim 6, wherein calculating a score for the line item compared to at least one product profile of the master product list comprises accounting for character set rules.

11. The method of claim 5, wherein calculating a score for the line item compared to at least one product profile of the master product list comprises scoring a comparison in part on the comparison of price parameter of the line item to a price parameter of a product profile.

12. The method of claim 5, wherein generating a receipt model further comprises identifying in the at least one line item a product metric parameter; and wherein calculating a score for the line item compared to at least one product profile of the master product list comprises scoring a comparison in part on the product metric of the line item matching a product metric of a product profile.

13. The method of claim 1, wherein generating a receipt model further comprises identifying in the at least one line item a text description, product metric, and price parameter; wherein calculating a score for the line item compared to at least one product profile of the master product list comprises scoring a comparison based on character matches of the text description of the line item and a text description of a product profile; wherein character matches are weighted based on a character weight rule; wherein scoring a comparison based on character matches comprises scoring based in part on character sequence order for the text description.

14. The method of claim 1, wherein selecting a product profile further comprises, retrieving a crowdsourced resolution of line item when a line item is determined to be unidentifiable.

15. The method of claim 1, wherein the image data of the physical purchase receipt is collected from a first user, and, in g), image data of a second purchase receipt is received from a second user.

16. The method of claim 1, wherein accounting for the selected product profile of the line item comprises updating a product profile of the master product list to reflect a purchase of the product.

17. The method of claim 16, wherein accounting for the selected product profile of the line item further comprises updating a product profile of the master product list to include identified line item parameters of the receipt.

18. The method of claim 16, wherein the selected product profile is a newly created product profile if no product profile is found in the product master list; and wherein updating a product profile of the master product list further comprises adding the newly created product profile to the master product list.

19. The method of claim 1, wherein the image data is collected from an application of a first user; and wherein accounting for the selected product profile of the line item comprises transmitting information feedback to the application.

20. The method of claim 19, wherein the transmitted information feedback is a monetary reward based on a number of image data collected from the first user account.

21. The method of claim 1, further comprising providing a receipt processing API; wherein capturing image data of a purchase receipt is through the receipt processing API; and wherein accounting for the selected product profile of the line item comprises replying to the receipt processing API with data of at least the one selected product profile.

22. A method improving receipt processing and product matching performance of a computing system through digitally tracking each of a set of physical products purchased by a user in a shopping trip, the method comprising:

a. capturing, from a camera of a mobile device, receipt image data of a physical purchase receipt comprising a set of physically printed line items corresponding to the set of physical products purchased in the shopping trip, wherein the set of physically printed line items are associated with a retailer-specific pattern, wherein the set of physical products comprises a physical product in multiple quantities, and wherein the mobile device is associated with a first user account and comprises the camera and a wireless communications module configured to communicate with a remote master product system;
b. converting the captured receipt image data to machine readable data;
c. generating a digital receipt model including a set of line items from the machine readable text data, the set of line items corresponding to the set of physically printed line items;
d. selecting a product profile to associate with a line item through one of a tiered set of receipt heuristics, comprising, through a direct identifier heuristic, searching for a product identifier from a line item that corresponds to a product profile, and through an approximate match heuristic, calculating a score for the line item compared to at least one product profile of a master product list, wherein calculating the score is based on the retailer-specific pattern for improving the product matching performance associated with a remote master product system;
e. at the remote master product system, accounting for a set of selected product profiles associated with the set of physical products purchased in the shopping trip, comprising accounting for the selected product profile of the line item and accounting for the multiple quantities of the physical product;
f. at the remote master product system, updating a purchase history of the first user account based on the set of selected product profiles;
g. generating purchase feedback tailored to the first user account based on the updated purchase history;
h. transmitting the purchase feedback to the mobile device;
i. repeating a) to h) for a second physical purchase receipt and a second mobile device associated with a second user account, thereby aggregating physical purchase receipt data at the remote master product system for improving the receipt processing and the matching performance associated with the remote master product system; and
j. at the remote server, sending data for the selected product profile, generated based on the first and second physical purchase receipts, to a device associated with a third user account in response to receipt of a request for the data.

* * * * *

UNITED STATES PATENT AND TRADEMARK OFFICE
CERTIFICATE OF CORRECTION

PATENT NO. : 9,646,286 B2
APPLICATION NO. : 13/754664
DATED : May 9, 2017
INVENTOR(S) : Jonathan Warren Brelig and Jared Morton Schrieber It is certified that error appears in the above-identified patent and that said Letters Patent is hereby corrected as shown below:

In the Claims

In Column 14, Line 21, "of line item when a line item is determined" should read "of a line item when the line item is determined"

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*